March 24, 1970     H. N. HONER     3,502,508
CATHODE FOR A DEFERRED ACTION BATTERY HAVING A HIGH
CAPACITY DEPOLARIZER ENCASED IN A HUMIDITY
RESISTANT DEPOLARIZER MATERIAL
Filed Aug. 2, 1967
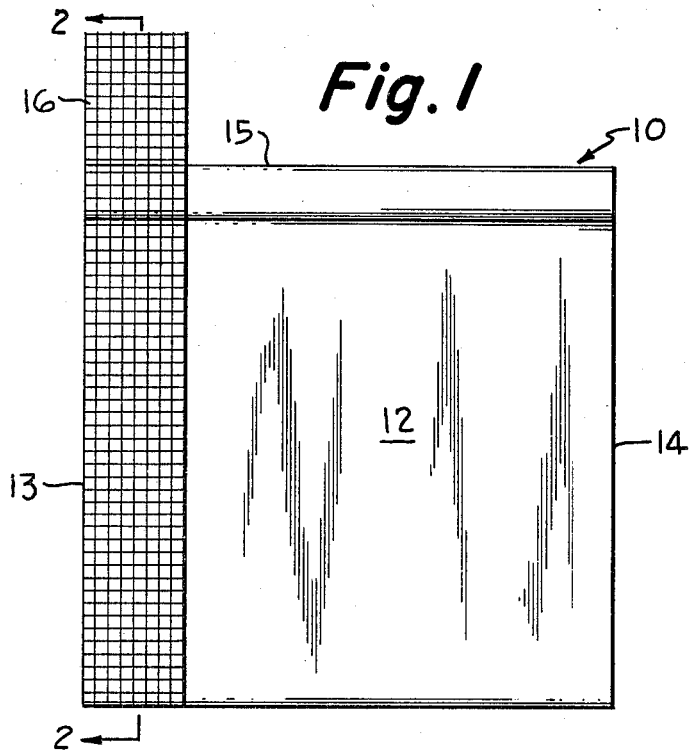
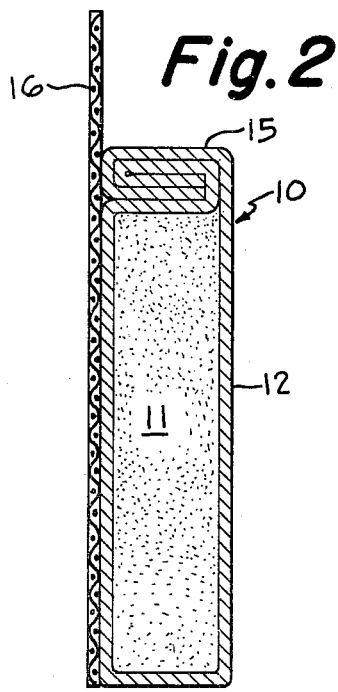
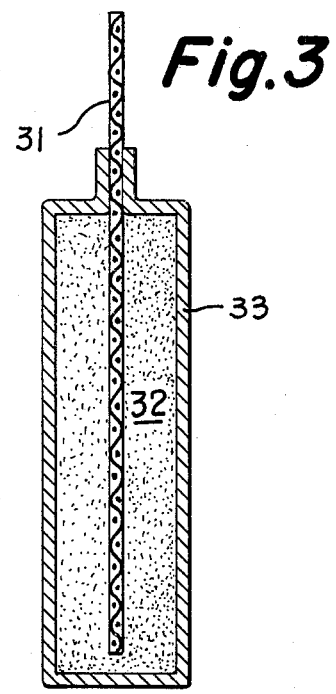

United States Patent Office 3,502,508
Patented Mar. 24, 1970

3,502,508
CATHODE FOR A DEFERRED ACTION BATTERY HAVING A HIGH CAPACITY DEPOLARIZER ENCASED IN A HUMIDITY RESISTANT DEPOLARIZER MATERIAL
Harold N. Honter, Wonewoc, Wis., assignor to ESB Incorporated, a corporation of Delaware
Filed Aug. 2, 1967, Ser. No. 657,927
Int. Cl. H01m 15/06, 13/00, 15/04
U.S. Cl. 136—100                    10 Claims

ABSTRACT OF THE DISCLOSURE

A cathode for a water activated deferred action battery comprising a high capacity depolarizer mixture of a compound yielding cuprous ions, graphite and a sulfur, selenium or tellurium additive encased in a humidity resistant depolarizer material. The humidity resistant depolarizer must have approximately the same operating voltage as the high capacity depolarizer, and silver halides and mercurous halides have been found to be suitable humidity, resistant depolarizers. It is preferred that both the high capacity depolarizer and the humidity resistant depolarizer be rapidly activated when contacted by aqueous solutions.

BACKGROUND OF THE INVENTION

Deferred action batteries using cuprous chloride cathode material are commercially available for applications requiring high capacity per weight of the battery. One of the principal features of these batteries is their very rapid activation upon contact with water or aqueous salt solutions. In U.S. Patent No. 3,205,096 issued on Sept. 7, 1965, I have disclosed an improved cathode material comprising a mixture of a compound yielding cuprous ions in an acid or neutral electrolyte and a substance selected from the groups consisting of sulfur, selenium and tellurium. This improved cathode material provides higher operating voltage, longer battery life (i.e., greater capacity) and more rapid activation. Unfortunately, it has been found that this improved cathode material has poor resistance to the deteriorating effects of a high temperature, high humidity atmosphere which impairs activation and capacity.

SUMMARY OF THE INVENTION

It is a principal object of this invention to provide a cathode comprising a mixture of a compound yielding cuprous ions, graphite and a sulfur, selenium or tellurium additive with improved humidity resistance. Other objects and advantages of this invention may be determined from the following description.

It has been discovered that the high capacity deplorizer mixture of a compound yielding cuprous ions, graphite and a sulfur, selenium or tellurium additive can be encased in or coated with a humidity resistant deplorizer material having approximately the same operating voltage to provide a useful, high capacity cathode having satisfactory high temperature-high humidity resistance. It is essential that the humidity resistant depolarizer have approximately the same voltage potential as the high capacity depolarizer in order to provide a substantially constant voltage during discharge of the battery. In other words, there should not be a substantial change in the battery voltage when the humidity resistant depolarizer has been expended and only the high capacity depolarizer is being discharged. The reason for this requirement is that the operation of an electronic device being powered by the battery could be adversely affected by a substantial change in battery voltage. Examples of humidity resistant depolarizers which may be used to encase or coat the high capacity depolarizer are silver halides and mercurous halides.

The humidity resistant depolarizer may be applied to the high capacity depolarizer in any one of several different methods. If the humidity resistant depolarizer is available in the form of a foil, e.g., silver chloride foil, it can be formed into an envelope into which the high capacity depolarizer may be placed and then sealed to prevent the atmosphere from contacting the high capacity depolarizer. Alternatively, the humidity resistant depolarizer can also be applied by forming a molten salt or solution of the humidity resistant depolarizer and spraying it onto an electrode plate of the high capacity depolarizer or by dip coating the electrode plate with the molten or dissolved depolarizer. It may also be feasible to vacuum form, extrude or mold the humidity resistant depolarizer into a case or container for receiving the high capacity depolarizer.

In addition to the similar voltage requirement, it is preferred that both the high capacity depolarizer and the humidity resistant depolarizer be rapidly activated when contacted by aqueous solutions. A cathode prepared in accordance with this invention has a combination of both humidity resistance and high capacity and is particularly useful in a deferred action battery.

BRIEF DESCRIPTION OF THE DRAWINGS

FIGURE 1 is a front elevation view of a cathode prepared in accordance with this invention;

FIGURE 2 is a cross-sectional view taken along the 2—2 in FIGURE 1;

FIGURE 3 is a cross-sectional view of an alternate cathode construction in accordance with this invention.

DETAILED DESCRIPTION

This invention is an improvement upon the cathode disclosed in U.S. Patent No. 3,205,096 which comprises a mixture of a compound yielding cuprous ions in an acid or neutral electrolyte and a substance selected from sulfur, selenium and tellurium, and hereinafter referred to as high capacity depolarizer. In accordance with this invention, the high capacity depolarizer is provided with improve humidity resistance by coating or encasing it with a humidity resistant depolarizer selected from silver halides and mercurous halides. Lead halides were also considered for use as the humidity resistant depolarizer, but their voltage potential is substantially below that of the high capacity depolarizer which precludes their use, for this could adversely affect the performance of the device powered by the battery.

These cathodes are particularly useful in a water activated deferred action primary battery which requires that both the high capacity depolarizer and the humidity resistant depolarizer be rapidly activated by water. These batteries generally utilize a thin sheet of magnesium, zinc, aluminum, calcium or alloys thereof as the anode material. The separators may comprise spacer means such as cotton thread or plastic pieces to separate the anodes and cathodes permitting the electrolyte to flow between the electrodes. For some applications, it may be desirable to use a bibulous separator sheet material to retain the electrolyte. In addition, it may also be desirable to incorporate minor amounts of graphite in the high capacity depolarizer composition to improve its electrical conductivity.

Referring specifically to the drawings, FIGURES 1 and 2 illustrate a cathode 10 prepared in accordance with this invention. For example, a high capacity depolarizer composition 11 comprising 62% by weight of cuprous chloride, 31% by weight of sulfur and 7% by weight of graphite is encased in a silver chloride foil 12 which improves the humidity resistance of the cathode 10. The silver chloride foil, having a thickness of 5 mils, can be formed into an envelope of the desired size by folding it over a mandrel and sealing the edges 13 and 14 by folding the edges over double in a multiple seam and then compressing the folded edges to form an airtight seal. Silver chloride foil having a thickness ranging from 3.5 to 10 mils has been found to be satisfactory, provided the foil is impermeable to air and moisture. The cuprous chloride-sulfur-graphite mix 11 is placed in the silver chloride envelope 12 which is then closed and sealed by folding the edges over double in a multiple seam 15 and then compressing the folded edges to form an airtight seal, similar to the edge seals 13 and 14.

After the depolarizer mix 11 is enclosed in the silver chloride envelope 12, the entire cathode is compressed to make good contact between the silver chloride foil and the depolarizer mix. A pressure of 1000 p.s.i. has been found to be satisfactory. After compressing the cathode, the surface of the silver chloride foil can be reduced to silver, which is conventional practice when using silver chloride cathodes, and a silver screen 16 or a silver foil is attached to the silver surface as an electrical connection. The screen 16 may be attached by pressing it into the silver surface, welding or by cementing it to the silver surface with a conductive cement.

In FIGURE 3, the cathode comprises a silver screen 31 electrical connection embedded in a high capacity depolarizer composition 32 comprising a cuprous halide-sulfur-graphite mix. The cathode is encased in a moisture-proof coating of a mercurous halide 33 which is applied by forming a molten solution of the mercurous halide and dipping the cathode therein several times.

In order to be sure that the high capacity depolarizer mix is completely protected from the atmosphere, the cathode can be tested for leaks or openings in the humidity resistant, silver chloride depolarizer. For example, the cathode can be dipped into a solution which will give a characteristic color in the presence of the high capacity depolarizer without affecting the humidity resistant depolarizer. Since the high capacity depolarizer yields cuprous ions when contacted with acid or neutral solutions, the cathode can be immersed in water for a short period of time, removed and dried, and then ammonium hydroxide added to the water which will turn a deep blue color if cuprous ions are present in the water.

Other methods of sealing the humidity resistant depolarizer can also be used, for example, heat sealing or cementing with an insoluble cement. As previously indicated, the humidity resistant depolarizer can also be applied by spraying it in the form of a molten salt onto a high capacity depolarizer plate or by dipping a high capacity depolarizer plate in a molten bath of the humidity resistant depolarizer.

The following example illustrates the improvement in electrode performance provided by encasing a high capacity depolarizer in a humidity resistant depolarizer.

EXAMPLE I

Batteries having a magnesium anode and a cuprous chloride-sulfur cathode were prepared and tested for capacity before and after storage in a high humidity atmosphere. The anodes for the batteries were made from commercial grade magnesium tubing having a 1.25 inch outside diameter, a 0.04 inch wall thickness and a 4.5 inch length. The batteries used 71 grams of cathode material comprising 62% $Cu_2Cl_2$, 31% S and 7% graphite.

In Battery A, the cathode materal was encased in a bronze 40 x 40 mesh screen tube having a 0.75 inch inside diameter and a 4.5 inch length. The cathode of Battery B was constructed in accordance with this invention, and the cathode material was encased in a silver chloride tube having a 0.75 inch inside diameter, a 10-mil wall thickness and a 4.5 inch length. In all batteries, the cathode was placed inside and spaced from the magnesium tube which had 2 water entry ports 0.136 inch in diameter and spaced 3.875 inches apart. In Battery A, the lead wire was attached by soldering directly to the bronze screen, and in Battery B, a 3-mil silver foil was welded onto the reduced surface of the silver chloride (silver) and the lead wire attached thereto. An asphalt sealing compound was used to close the magnesium tube ends and to secure the cathode spaced from the magnesium anode.

Batteries A and B were initially tested for capacity (measured to a cutoff voltage of 1.00 volt) with Battery A operative for 72.3 hours and Battery B operative for 121.7 hours. The greater capacity of Battery B was caused by the silver chloride tube which also functioned as battery active material. An identical set of Batteries A and B werestored in a warm, humid atmosphere (90% relative humidity at 90° F.) and were later tested for capacity. Battery A was stored for only 24 hours and its capacity had fallen to 49 hours operation. Battery B (this invention) was stored for 90 days and its capacity yielded 117.6 hours. Battery A had a reduction in capacity of 32% in 24 hours storage whereas Battery B had a capacity reduction of only 3% in 90 days storage.

It should be noted that in this example, air separation was used to space the cathode from the anode, which is the best type of construction for resistance to humidity. In battery constructions utilizing a bibulous separator, the cuprous chloride-sulfur cathode mix is subject to even more rapid deterioration in a warm, humid atmosphere.

There are several additional advantages provided by the cathode construction of this invention. In cells using these cathodes, there appears to be no copper ion migration to the anode (magneium) which eliminates any local action which might occur between the copper and anode active material. Furthermore, there appears to be reduced sludge formation upon discharge of the cell which improves electrolyte circulation and ultilization of the electrode active material by preventing "masking."

Having completely described this invention, what is claimed is:

1. A cathode for a deferred action battery comprising a high capacity depolarizer mixture of a compound yielding cuprous ions, graphite and an additive selected from sulfur, selenium and tellurium encased in and in contact with a humidity resistant depolarizer material selected from a silver halide and a mercurous halide, whereby the high capacity depolarizer is prevented from contacting the atmosphere.

2. A cathode in accordance with claim 1 in which the compound yielding cuprous ions is selected from cuprous chloride, cuprous iodide and cuprous bromide.

3. A cathode in accordance with claim 1 in which the humidity resistant depolarizer material is selected from silver chloride and mercurous chloride.

4. A cathode in accordance with claim 1 in which the humidity resistant depolarizer is silver chloride.

5. A cathode in accordance with claim 1 in which the high capacity depolarizer is a mixture of cuprous chloride, graphite and sulfur, and the humidity resistant depolarizer is silver chloride.

6. A deferred action water activated battery comprising an anode selected from magnesium, zinc, aluminum and calcium and a cathode comprising a high capacity depolarizer mixture of a compound yielding cuprous ions in the presence of water, graphite and an additive selected from sulfur, selenium and tellurium encased in and in contact with a humidity resistant depolarizer material selected from a silver halide and a mercurous halide.

7. A battery in accordance with claim 6 in which the compound yielding cuprous ions is selected from cuprous chloride, cuprous iodide and cuprous bromide.

8. A battery in accordance with claim 6 in which the high capacity depolarizer is a mixture of cuprous chloride, graphite and sulfur, and the humidity resistant depolarizer is selected from silver chloride and mercurous chloride.

9. A battery in accordance with claim 6 in which the anode is magnesium and the high capacity depolarizer is a mixture of cuprous chloride, graphite and sulfur.

10. A battery in accordance with claim 6 in which the anode is magnesium, the high capacity depolarizer is a mixture of cuprous chloride, graphite and sulfur, and the humidity resistant depolarizer is silver chloride.

References Cited

UNITED STATES PATENTS

| | | | |
|---|---|---|---|
| 2,428,850 | 10/1947 | Lawson | 136—137 |
| 2,634,305 | 4/1953 | Davis | 136—100 |
| 2,670,395 | 2/1954 | Audubert et al. | 136—136 |
| 2,942,050 | 6/1960 | Denes | 136—3 XR |
| 3,205,096 | 9/1965 | Honer | 136—100 |
| 3,279,952 | 10/1966 | Minnick | 136—100 |

ALLEN B. CURTIS, Primary Examiner

A. SKAPARS, Assistant Examiner

U.S. Cl. X.R.

136—120, 137